INVENTOR.
RUSSELL R. LAW,
BY Robert Thompson
ATTORNEY.

INVENTOR
RUSSELL R. LAW,
BY
Robert Thompson
ATTORNEY.

INVENTOR.
RUSSELL R. LAW,
BY Robert Thompson
ATTORNEY.

INVENTOR.
RUSSELL R. LAW,
BY Robert Thompson
ATTORNEY.

INVENTOR.
RUSSELL R. LAW,
BY
Robert Thompson
ATTORNEY.

United States Patent Office 3,423,526
Patented Jan. 21, 1969

3,423,526
NARROW-BAND TELEVISION

Russell R. Law, Malibu, Calif., assignor to Hughes Aircraft Company, Culver City, Calif., a corporation of Delaware Filed Jan. 21, 1965, Ser. No. 427,069
U.S. Cl. 178—6.8 14 Claims
Int. Cl. H04n 7/00

ABSTRACT OF THE DISCLOSURE

A narrow-band television system in which substantially redundant frame-to-frame video information is transmitted as one high resolution video frame per predetermined time period at a slow frame rate, by storing one out of every predetermined plurality of image frames on a storage means, and transmitting the stored information at a slow scan rate; and in which animation information is transmitted as a series of difference signals at a real time frame rate by comparing the real time image frame to the stored image signal frame to cancel any redundant image signal information and generate a difference image signal which corresponds to changes between the real time images and the stored image and transmitting it at a real time frame rate.

This invention relates to a narrow-band television system and more particularly to a television system which materially reduces the need to transmit redundant and frame-to-frame picture information.

For purposes of explanation, a standard television picture can be considered to be a mosaic of 525 lines x 525 lines repeated at 30 frames per second with conventional interlace of two fields per frame.

Studies of the standard television picture have shown that much of the frame-to-frame picture information is redundant. That is, aside from scene changes and rapidly moving objects, the only significant changes within a picture in a sequence of frames occurs as a result of lateral movement and vertical movement of the camera while following a moving object relative to a stationary background, and as a result of changes between close-up views and distant views. Conventionally, the camera movement information is referred to as pan, pitch and roll information, and changes between views as zoom information, respectively. Hereafter, these movements will be used in accordance with the following definitions: pan will be defined as horizontal movement of the camera to keep it trained on a moving object or secure a panorama view; pitch will be defined as vertical movement of the camera as it is tilted up or down; roll which will be defined as rotation of the camera about its optical axis; and zoom will be defined as changes in lens setting to move between close up views and distant views.

Additional studies have indicated that the human sight processes are able to fill in details in rapidly moving images. Thus, for rapidly moving images, only a portion of any animation information need be viewed, whereupon the human optical system is capable of filling in the missing information to give the appearance of full movement. As a result of this remarkable optical ability, the subjective quality of the image is high even though only a limited amount of visual information is present. A fuller discussion of this phenomenon is found in the Proc. IRE, vol. 21, pp. 1639–1651, December 1933.

Accordingly, it is an object of this invention to provide a narrow-bandwidth television system which takes advantage of the redundancy in picture information between successive frames and takes advantage of the ability of the human optical system to fill in details in rapidly moving images.

Another object is to provide television bandwidth reduction relative to a standard television system while retaining picture quality above a predetermined level.

Still another object is to reduce the bandwidth of a quality television picture to a bandwidth that can be easily processed without the need for expensive and complex equipment.

Yet another object is to provide a television system of the above type in which the transmitter is lightweight, easily transported, inexpensively constructed, and requires low operating power.

A further object is to provide a narrow-bandwidth television system of the above type which is completely compatible with a standard television system.

The above and other objectives of this invention are accomplished by providing a television system which can divide a real time television picture into the following two image components: a high-resolution image component having a frame rate of once each time period; and a series of difference image components having a frame rate of n-times per time period and containing only the image information corresponding to change between the real time image and the high-resolution image component. This image division operation can be achieved by providing a television camera which generates real time image signals at a frame rate of n-times per predetermined time period. This real time image signal is fed to a selector means which selects every *n*th image frame and feeds the selected image frame to a storage means. The storage means is of the type that can be nondestructively read out at any reasonable repetition rate. Thus, the output of the storage means can be used to provide the high-resolution image component having a frame rate of once per time period. In addition, the real time image signal and the stored image signal are continually compared to one another at a comparator means whereby the redundant signal information is canceled and a difference signal component which corresponds to changes between the real time images and the stored image is generated. To transmit the image signal components to a data medium, the high-resolution image signal can be read out of the storage means at a slow frame rate of once per time period and the difference image signal can be read out of the comparator means at a faster frame rate of n-times per time period. The only limitation on the readout rate of the two image components is that the bandwidth limitations of the data medium should not be exceeded.

A receiver station is adapted to receive the two image signal components from the data medium and recombine them into a composite image signal. To accomplish this recombination of the received image components, the high-resolution image signal is fed to a storage means where it is stored for one time period. While one high-resolution image signal is being received and stored on a storage means, the preceding and preciously stored high-resolution image signal is being read out of the storage means at a repetition rate of n-times per predetermined time period. The difference image signal component and this repetitively read out image signal are thereafter added together in substantial synchronism with one another to provide a composite image signal in which the repetitively app'ied high-resolution image signal provides the background and body of the composite image signal. This composite image signal can then be applied to a display means and viewed thereat.

By placing position sensors on the television camera so that pan, pitch, roll and zoom information can be generated by simple circuits, it is possible to substantially synchronize the stored high-resolution image components with the corresponding portions of the difference image signal components. Thus, as the camera is moved, the high-resolution stored image component is repositioned to correspond with image shifts in the real time image information, whereby the difference image signals generated need only contain a relatively small amount of image change information. In addition, the camera movement information can be added to the horizontal flyback signal of either the difference image signal or the high-resolution image signal and transmitted on the normally unused image transmission bandwidth. An advantage of this approach is that transmission bandwidth can be held to a minimum by utilizing an available bandwidth to a fuller extent. In addition, to prevent the high-resolution image from running off the edge during pan, pitch, or roll operations, the stored image can be normally underscanned at the receiver station to provide a normally unused image frame border for image travel during the time interval prior to the reception of the subsequent high-resolution image.

Other objects, features and advantages of this invention will become apparent upon reading the following detailed description of several embodiments and referring to the accompanying drawings in which.

Figure 1:
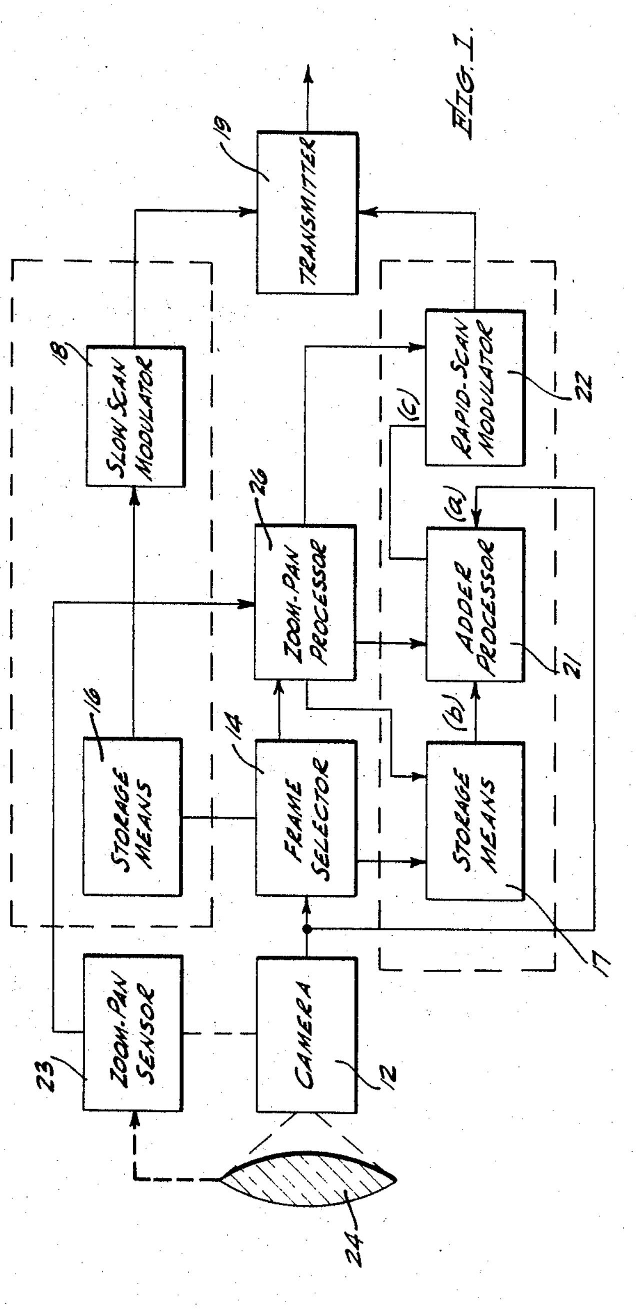
FIG. 1 is a block diagram of a preferred embodiment of a television camera and transmitter station.
Figure 2:
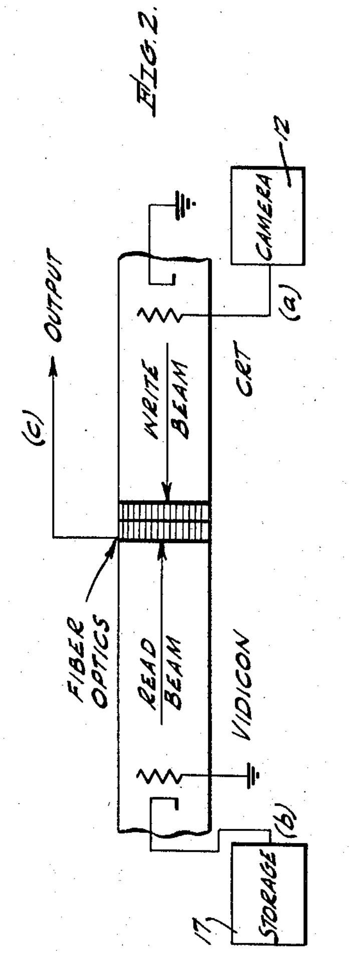
FIG. 2 is a schematic diagram illustrating the operation of the adder processor element or comparator of FIG. 1.
Figure 7:
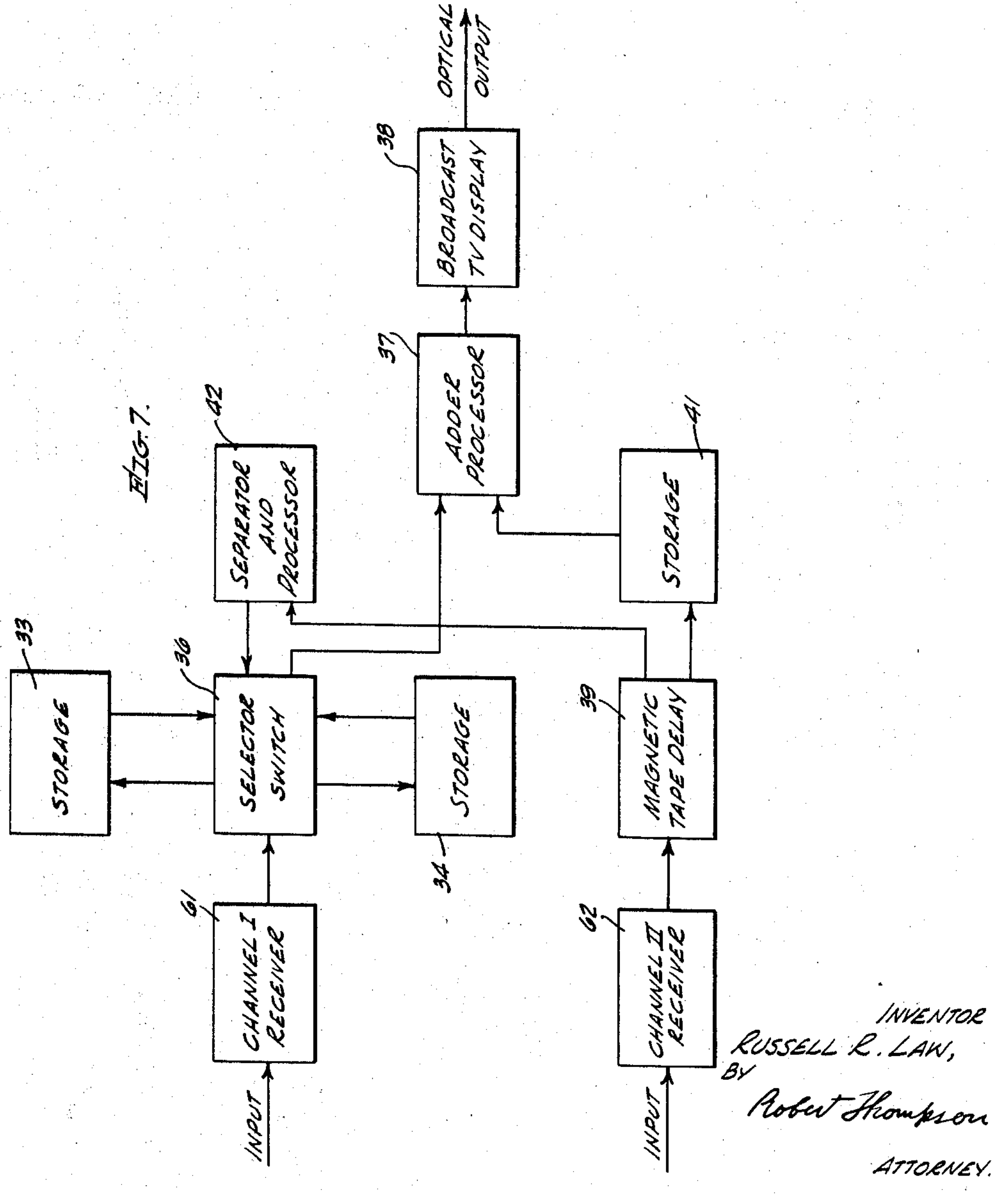
Figure 4:
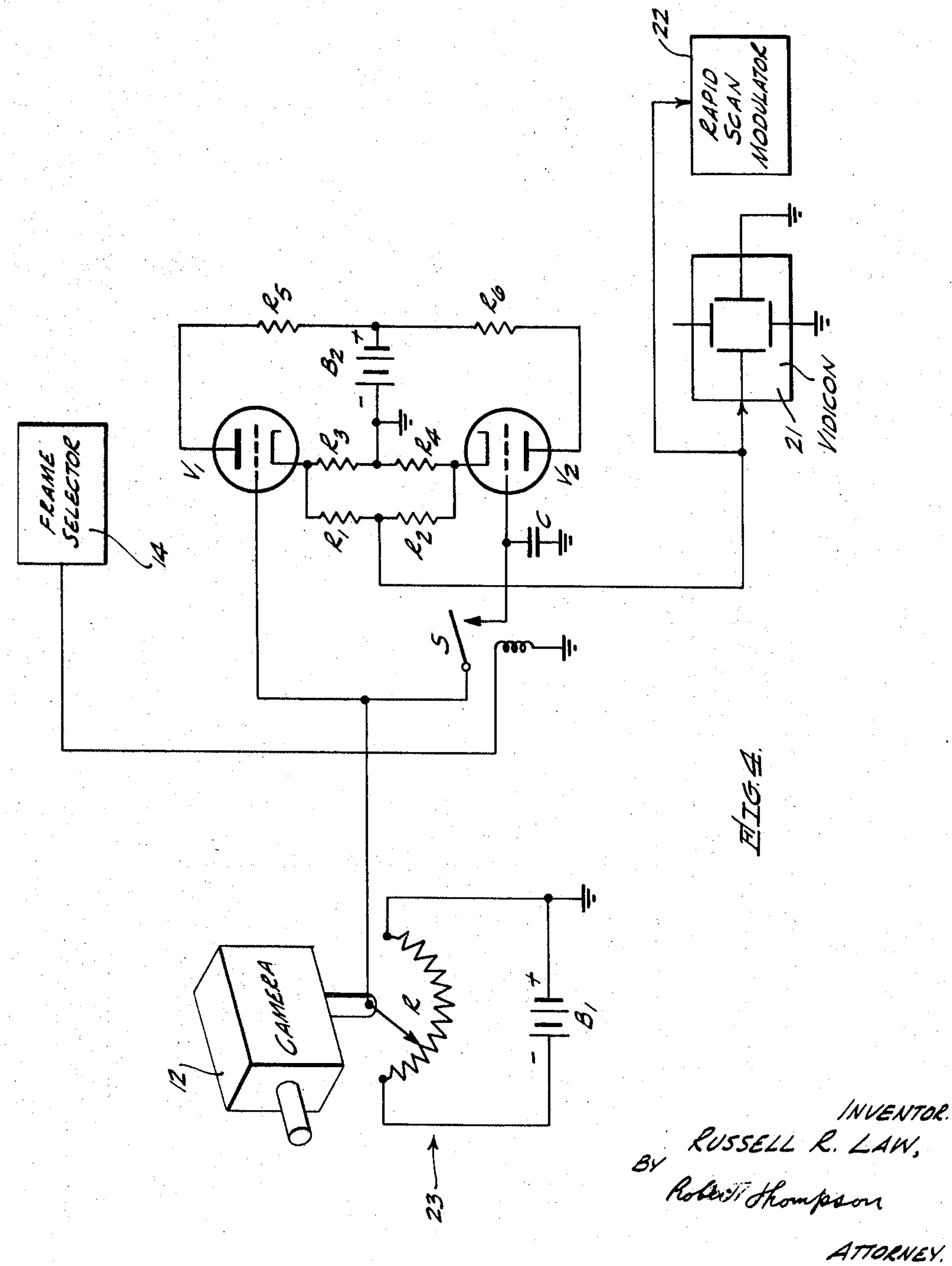
Figure 5:
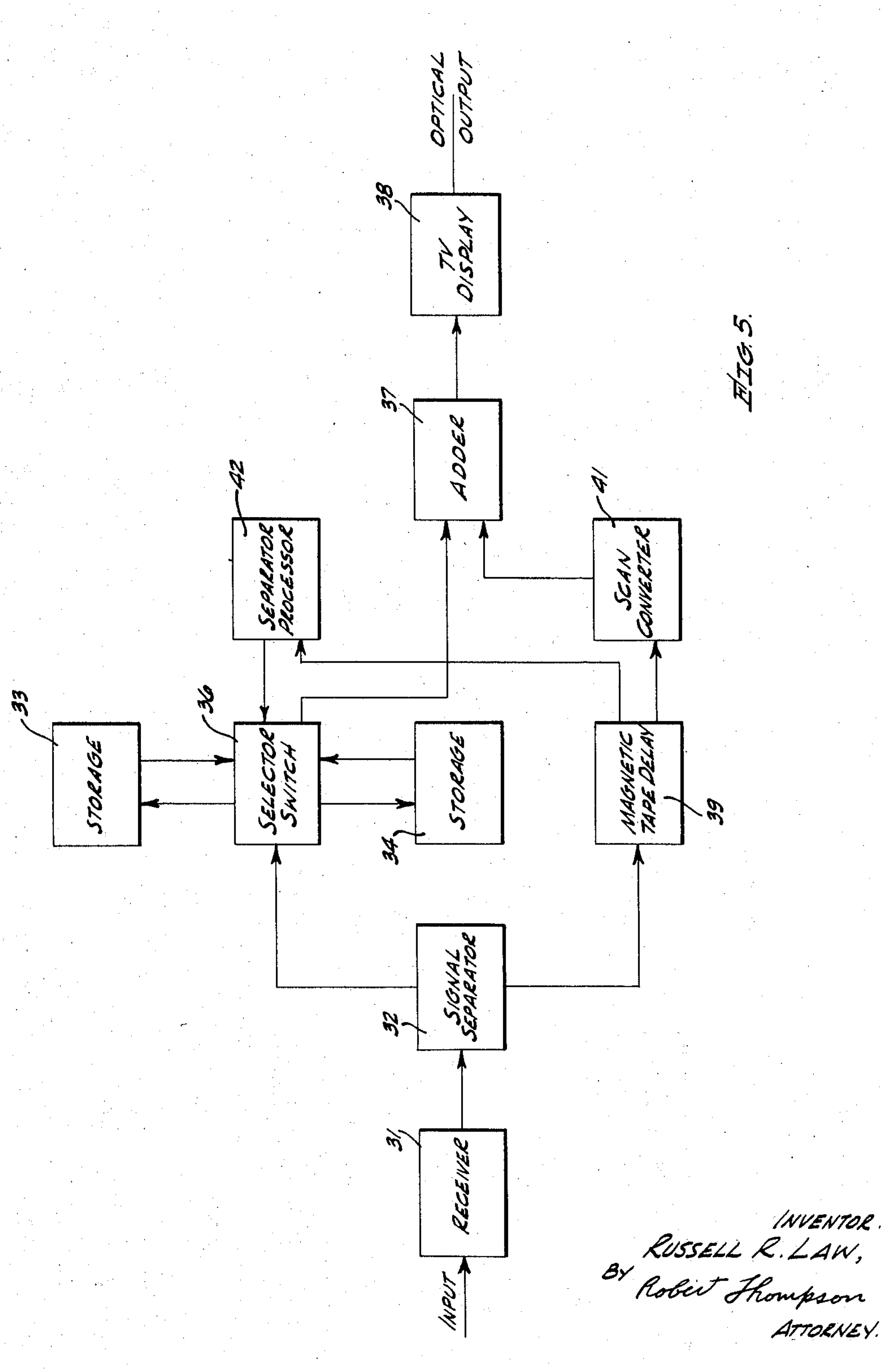
Figure 6:
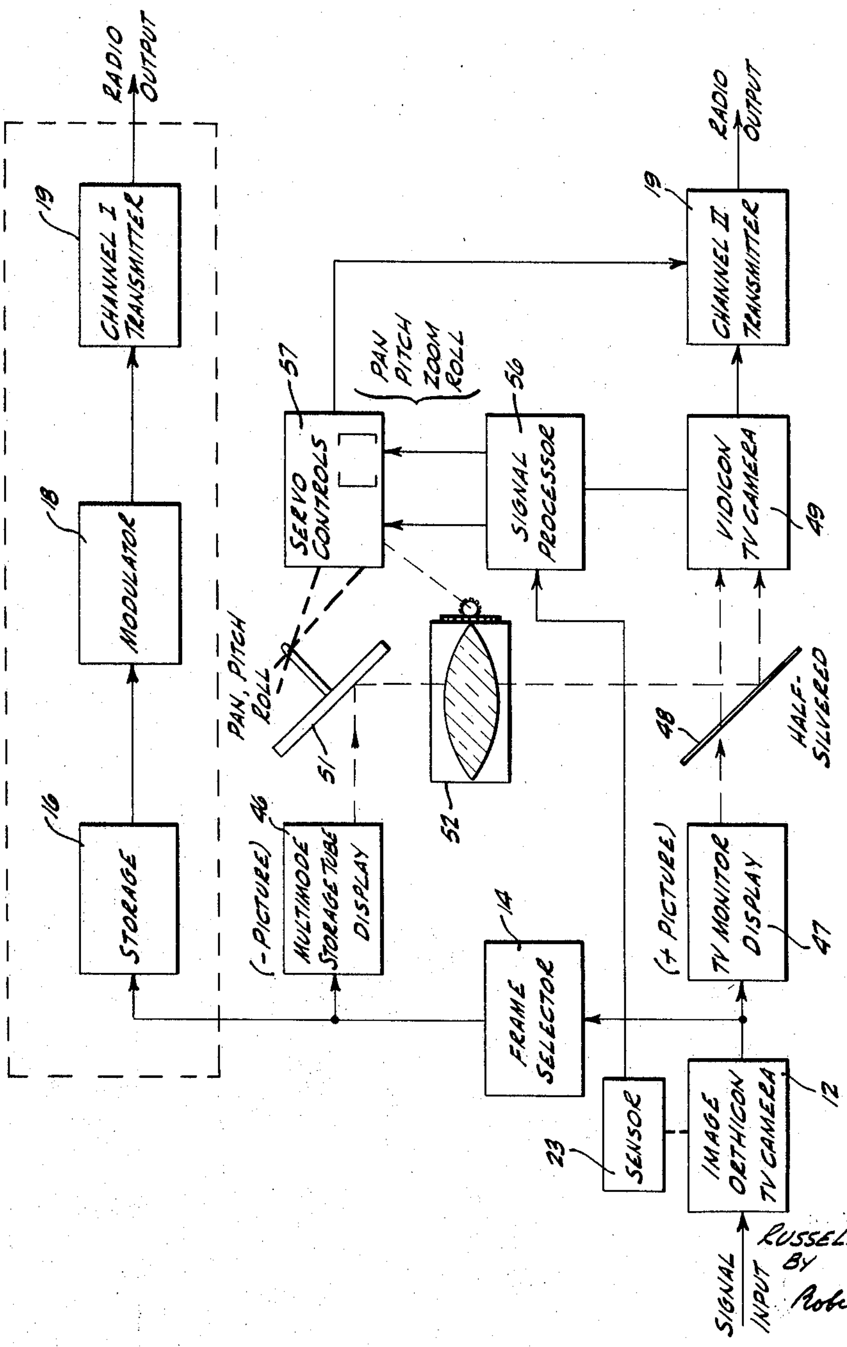

FIGS 3*a*–3*d* are graphs schematically illustrating the function of the comparison operation of the adder processor of FIG. 2;

FIG. 4 is a circuit diagram of a signal processor used throughout the circuits;

FIG. 5 is a block diagram of a television receiver which can be used with the transmitter circuit of FIG. 1;

FIG. 6 is a block diagram of a second embodiment of a television camera and transmitter station; and FIG. 7 is a block diagram of a second embodiment of a receiver circuit which can be used with the transmitter circuit of FIG. 6.

Referring to the drawings, one television system embodying the features of this invention includes a transmitter station (FIG. 1) which converts an image to two image components which require a narrow bandwidth signal for transmission to a receiver station (FIG. 5). At this receiver station the narrow bandwidth signal is processed and is reconverted as an optical display output for a viewer.

As will be described in more detail shortly, the transmitter station of FIG. 1 includes a television camera 12 which receives an optical image and generates an electrical output signal that can be translated into a standard television image. This output signal is fed to a frame selector 14 which periodically impresses television images upon two storage means 16 and 17 at a rate of one image each predetermined time period. At the end of each time period the stored image is erased and a subsequent image is stored.

A high-resolution picture channel transmits a slowly scanned picture signal received from the storage means 16. In operation, the output of the storage means 16 is taken at full image resolution of 525 x 525 lines and at a slow scan rate of once each time period. This high-resolution signal is fed through a modulator 18 and to a transmitter 19 for transmission to a receiver station. As preiously discussed, this high-resolution, slow-scan signal will be used to provide the background and body of the picture and images received at the receiver station.

A low-resolution picture channel transmits a low-resolution difference image signal which contains only non-redundant image information between the high-resolution output signal from storage means 17 and the real time picture output signal generated by the television camera 12. In operation, a comparator or an adder-processor 21 receives picture information from the storage means 17 at one image polarity and a real time signal from the television camera 12 at an opposite image polarity with the gammas and gains of the two opposite image polarity signals adjusted so that no difference signal will be derived from the adder-processor 21 except when objects have moved in the real time scene. The series of low-resolution, difference signals, which are generated at a rate of n-times per time period, are fed through a modulator 22 and to a transmitter 19 for transmission to a receiver station. When recombined with or superimposed on the high-resolution, slow-scan picture, the low-resolution difference signal adds movement information to the outline or border of moving objects.

Referring now to the transmitter station illustrated in FIG. 1 in more detail, the television camera 12 can be of any conventional type such as the image orthicon camera described in Zworykin, V. K. and Morton, G. A. Television 2nd Ed., New York, Wiley 1954, Ch. 21.3 pp. 965–974. As is conventional with this type of camera, a viewed scene is focussed upon the retina of an image orthicon tube through the variable lens means 24. By means of a conventional electronic scanning process, the optical image is converted to an electrical signal that can be reconverted to the same optical image when necessary. This scanned image can be a standard 525 line x 525 line picture which is repeated at 30 frames-per-second with each frame being further divided into two interfaced fields of 262.5 raster lines.

Since, however, this standard television picture signal normally requires a wide bandwidth, it is not possible to accomplish the objectives of this invention without substantially reducing the bandwidth. Accordingly, the following technique is used to reduce the bandwidth without degrading the picture beyond the point where it no longer provides useful information.

A full resolution picture signal from the television camera 12 is applied to a frame selector 14 which applies every 30th frame to the two storage means 16 and 17. Thus, a complete image frame of two interlaced fields is applied to each of the two storage means once each second with a standard television picture. During the vertical flyback portion of the 30th frame the image signals stored in the storage means 16 and 17 are erased. One circuit that could accomplish these frame selector operations is described and illustrated in the previously referenced book Television, page 599, Figure 14.50.

Referring now to the electrical storage means 16 and 17 in more detail, each storage means could include a conventional recording storage tube which is capable of storing the picture information without serious deterioration of signal strength or quality over the one second time interval. One storage tube which is capable of performing the required function is the Raytheon CK7571/QK685 described and illustrated in the Raytheon Technical Information Bulletin, dated 11/1/59. In operation, the storage means are written into, read, and erased electrically by beam control to provide an electrical output signal in accordance with discussion in Electronics World, May 1963, pp. 21–24 and 78, "Recording Storage Tubes and Their Applications," A. S. Luftinan.

Of course, there are other storage means which could be used, such as an endless magnetic belt in which the picture signal is stored as the tape moves under a write head at a high tape speed and is read as the tape moves under a read head at a much slower speed.

With both of these storage arrangements, the selected frame information would be stored in $\frac{1}{30}$ of a second and would be read out of the storage means over a full one-second time period.

Referring now to the high-resolution, slow-scan channel, the electrical storage means 16 provides the image information for one frame over the one-second time interval. As the storage means 16 is slowly scanned, the electrical output signal generated is operated on by modulator 18 to provide an electrical signal that can be transmitted or otherwise handled. One modulator that could perform this function is described and illustrated in Radio Engineers Handbook, 1st Ed. by F. E. Terman, McGraw-Hill, New York, p. 535, Figure 4.

The output from the modulator 18 is applied to a transmitter 19 where it is operationally changed to an electrical signal which can be transmitted to a conventional data link. Conventional transmitter systems and techniques that could be used are described and illustrated in M.I.T. Radiation Laboratory Series, vol. 20, New York, McGraw-Hill, 1949, "Electronic Time Measurements," pp. 391–416, and in Black, H. S. "Modulation Theory," New York, Von Nostrand, Ch. 5, pp. 59–70.

Referring now to the details of the difference signal channel, the real time image signal of circuit (a) generated by the television camera 12 and the image signal of circuit (b) stored by the storage means 17 are continually compared with one another at the adder-processor circuit 21, whereupon, a difference signal in circuit (c) is generated only when movement has occurred between the stored scene and the real time scene. To achieve this comparison operation, one of the images is made negative relative to the other image with the gammas and gains so adjusted that no difference signal (c) will appear in output circuit (c) of the adder-processor 21 unless there is a change between the scenes. By way of definition in the negative image signal, the blacks are white and the whites are black.

This image signal comparison operation can be better understood by referring to the adder-processor schematically illustrated in FIG. 2. In operation, the electrical output signal (b) from the storage means 17 is applied to the adder-processor to cathode modulate the read beam voltage of a standard vidicon tube. This modulation of the read beam voltage results in a change in the charge density pattern which is deposited on a photoconductor layer at the vidicon face. The real image signals (a) are in turn applied to modulate the write beam voltage of a standard cathode ray tube (CRT) which is positioned in axial opposition to the vidicon tube. The faces of both the vidicon tube and the cathode ray tube have a fiber-optics face plate so that the negative image modulation on the vidicon tube is optically coupled to the positive real time image on the cathode ray tube causing the two scenes to subtract from one another. When movement occurs in the real time image, the two images are no longer congruent and, as a result, that information pertaining to movements in the real time scene causes a difference output signal (c) to be generated on the output lead which is electrically connected to the photoconductor surface of the vidicon. This operation is continually repeated at a rate of 30 times per second. To achieve low-resolution on the difference signal (c) (158 lines x 158 lines), the vidicon tube need only be reduced in resolution.

Figures 3A, 3B, 3C, 3D:
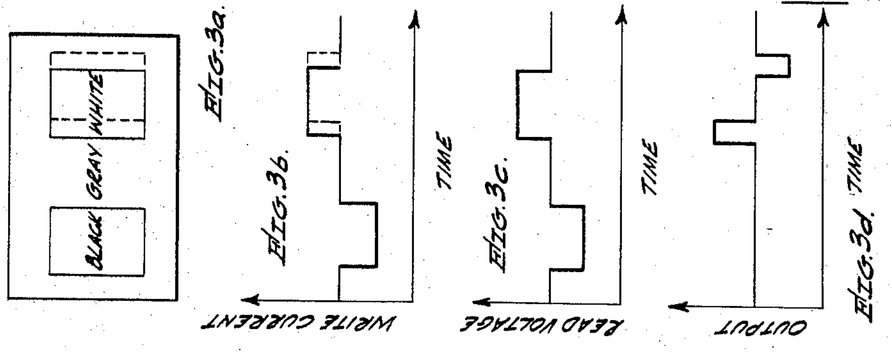

To explain this comparison or subtraction principle in more detail, reference is made to the graphs of FIGS. 3*a*–3*d* in which FIG. 3*a* can be thought of as a schematic illustration of a portion of the television picture mosaic. Of course, it should be understood that this is not an accurate representation of the picture mosaic but is merely intended as illustrative and explanatory information.

In operation, as the write beam, which is modulated by the real time scene signal, scans the phosphor layer of the cathode ray tube the beam current varies with raster position as shown in FIG. 3*b*. As the raster position of the write beam moves across the mosaic of FIG. 3*a* an average or median level of current is genrated while the write beam traverses the gray portion of the image, a reduced level of current is generated while the beam traverses the black portion of the image, and an increased level of current is generated while the write beams traverses the white portion of the image. The light generated by the electron beam impinging on the phosphor layer of the CRT is transmitted through the fiber-optics to the facing photoconductor layer on the face plate of the vidicon tube.

The conductivity of the photoconductor layer is influenced by the light falling upon it as follows: in the gray regions the layer has an intermediate conductivity; in the black regions it has a low conductivity; and in the white regions it has a high conductivity. The read beam of the vidicon is in turn cathode modulated by varying the cathode voltage in accordance with the stored image in the manner shown in FIG. 3*c*. That is: in the gray regions the cathode has an intermediate voltage; in the black regions it has a low voltage; and in the white regions it has a high voltage.

Since the charge deposited on the photoconductor layer depends upon the number of electrons required to charge the photoconductor surface to cathode potential, the several proportionality factors may be so adjusted that the charge deposited is constant and no signal is derived on the output electrode (c) except in the case of moving objects in the real time scene. This comes about because: in the black regions where conductivity is low a high voltage is maintained across the photoconductor layer; in the gray regions where the conductivity an intermediate voltage is maintained; and in the white regions where the conductivity is high a low voltage is maintained. Thus, the current flowing through the photoconductor is everywhere constant and, as a result, the charge deposited is constant.

In the case of a moving object in the real time scene, as indicated by the white bar moving to the right to the dashed line position of FIG. 3*a*, the write current of the CRT is shifted to the dashed position of FIG. 3*b* and the conductivity pattern on the photoconductor layer of the vidicon is altered so that it no longer matches the former read voltage pattern. At the edge which originally was white, the conductivity is reduced and fewer electrons are deposited by the read beam so that a positive output pulse is generated on electrode (c) as shown in FIG. 3*d*. Similarly, at the edge which originally was black, the conductivity is increased and more electrons are deposited by the read beam to give a negative output pulse.

A vidicon tube circuit that could be used for this purpose is described and illustrated in the previously referenced Television, paragraph 10.10, pp. 374–377. A cathode ray tube circuit which could be used to perform this function is described and illustrated in Anner, G. E., Elements of Television Systems, 1951, New York, Prentice-Hall, Ch. 8, pp. 342–361. The electrical output signal of the circuit (c) from the adder-processor is applied to a modulator 22 where it is converted to an electric signal that can be transmitted or otherwise handled. This modulator 22 can be of the same type as the previously referenced modulator 18.

Of course it should be understood that other signal comparison techniques could be used rather than the above described adder-processor to accomplish the overall system objectives.

The output from the modulator 22 is applied to the transmitter 19 where it is operationally changed to an electrical signal which can be transmitted to a conventional data medium. The method of transmission could be by multiplexing or any other conventional method, whereas, the data medium would not necessarily be limited to a transmission line, atmosphere, or space, but could include a magnetic recorder.

By adding camera position and mechanical movement information to the horizontal flyback signal of the low-resolution, rapid-scan signal, a full use of the available bandwidth can be made.

In operation, camera position information is detected by a sensor means 23 which is mechanically coupled to the television camera 12 and to a conventional camera lens means 24 so that mechanical movement of the camera and the lens means can be resolved into electrical signals. These electrical signals are fed to a signal processor circuit 26 which is capable of converting the camera position information to pulse information and impressing the pulse information on the horizontal flyback signals derived from the adder-processor 21. In addition, the output from a signal processor circuit 26 can be used to control the scanning raster in the storage means 17 so that the normally underscand picture can be effectively repositioned in the same way as the real time picture actually moves, thereby eliminating edge effects and mismatch between the stored high-resolution picture and the real time picture. Hereafter, this repositioning and matching of the images will also be referred to as synchronizing the images or signals.

Referring now to the pan, pitch, roll, and zoom information conversion process in more detail, the sensor means 23 can include a conventional resolver for each axis of movement, and which are mechanically connected between the camera 12 and a camera stand to operatively sense movement of the camera about its orthogonal axes. In addition, the conventional zoom lens means 24 is coupled to a resolver in the sensor means 23 so that lens movement is also resolved to an electrical signal. The electrical output signals which are developed by the camera movement can be variable amplitude DC and are applied to the signal processor circuit 26 where they can be converted into some other usable form. For instance, the camera pan, pitch, and roll information from the separate resolvers can be transformed into a modulating signal which is applied to deflect the read beam (a) of the vidicon tube in the adder-processor circuit 21 so that the normally underscanned scene is repositioned or moved about the stored scene in accordance with camera movement, in the following manner. Pan signal provides a sidewise deflection of the readout to the left or right, according to whether the camera is panned to the left or to the right. Pitch signal provides a vertical deflection of the readout depending upon whether the camera is tilted upward or downward. Zoom signal provides for amplitude deflection of the readout, depending upon whether the camera lens was zooming in or zooming out, or the camera was moving forward or backward from the scene. Roll signal provides for rotated deflection of the readout signal, depending upon which direction the camera is rotated. As a result, the stored scenes will always be matched to the real time scene so that the two scenes can be substantially superposed upon and matched with one another at all times. In addition, the zoom information can be applied to vary the scan amplitude of the read beam so that effective enlargement of the stored image on the photoconductive surface of the vidicon tube is obtained. The camera movement information can also be converted to pulse information by pulse amplitude modulation and applied to the modulator 22. As a result, the normal unused horizontal flyback portion of the low-resolution, rapid-scan video signal can be utilized to carry the pan, pitch, roll, and zoom information. As will be explained shortly, this transmitted pan, pitch, roll, and zoom information is used to reposition the high-resolution, slow-scan picture information at the receiver station in accordance with the change in position of the real time scene.

One circuit technique that can be used to accomplish the above discussed operations is the signal processor circuit 26. The input to this circuit is generated by the sensor 23 having a potentiometer R carrying a DC current supplied by the battery $B_1$. The input voltage supplied to the signal processor circuit 26 thus depends upon the pan position of the camera 12. This input voltage may be applied to the two vacuum tube circuits $V_1$ and $V_2$ of a balanced differential amplifier. In operation, the frame selector 14 serves to close the relay switch S, causing the condenser C to charge at the instant a particular frame is being recorded on the storage means 17. This voltage is supplied to the grid of vacuum tube $V_2$. The voltage supplied to the grid of vacuum tube $V_1$ varies from the voltage applied to the grid of $V_2$ in proportion to the instantaneous panned position of the camera. At the instant the relay switch S is closed these grid voltages are equal and the currents through the two vacuum tube circuits are equal so the mid-tap between equal resistance resistors $R_1$ and $R_2$ is zero. If a pan motion occurs the grid voltage on $V_1$ increases or decreases causing an unbalance in the differential amplifier so that the voltage across the cathode resistor mid-tap varies in a positive or negative direction depending upon whether the camera is panning to the right or to the left. This voltage may in turn be amplified and applied to the defleltion plates of the read beam in storage means 17 to maintain the superimposed relationship of the two images in the manner heretofore described. The voltage is also applied to the modulator 22 where it is converted to pulse signals and applied to the horizontal or vertical flyback portion of the difference signal (c). It should of course be understood that this circuit technique could also be used for the pitch, roll and zoom information.

Referring briefly to the receiver station illustrated in FIG. 5, the image information received from the transmitter station is reconstructed for viewing as follows. The incoming image information is demodulated by a receiver means 31 and applied to a signal separator 32 which separates the high-resolution slow-scan image signal from the low-resolution, rapid-scan differential image signal.

The high-resolution, slow-scan picture signal is fed alternately into storage means 33 and 34 by a selector switch means 36. The selector switch 36 also alternately makes and breaks a circuit connection with the output of the storage means 33 and 34 so that the one storage means is being read while the received image signal is being accumulated on the other storage means. The selected storage means is read out at a standard television rate and the electrical signal so generated is applied to an adder means 37 for subsequent application to a television display 38.

Since the high-resolution, slow-scan image does not provide sufficient animation for the average viewer, it is necessary to add the low-resolution, rapid-scan differential signal to the high-resolution, slow-scan signal in the following manner. The incoming low-resolution, rapid-scan signal is separated at the signal separator 32 and is applied to a delay means 39 which delays the low-resolution signal in order to compensate for the time spent in accumulating the high-resolution, slow-scan signal on one of the storage means 33 and 34. As a result, the low-resolution, rapid-scan signal and the high-resolution, slow-scan signal will be in substantial synchronism with one another. The low-resolution differential image output from the delay means 39 is converted to the same form as the high-resolution output from the readout means 33 and 34 by a converter means 41 and is applied to the adder means 37. At the adder means 37, the high-resolution signal and the low-resolution signal are added to one another to provide a single image signal which is applied to a television display 38. At the television display 38, the combined signal is reconstructed as a television picture which may be displayed on a conventional television monitor or used for local rebroadcast.

Depending upon the rate of pan, pitch, roll, or zoom operations, the high-resolution image signal could be mismatched with the low-resolution image signal or could begin to run beyond the edges or borders of the scene during each frame unless some means of compensation is provided. To avoid this mismatch and edge effect, it is only necessary to underscan the readout of the storage means 33 and 34 at the receiver, or to overscan the television display 38. To provide for correction of the pan, pitch, roll and zoom, the information contained on the horizontal flyback portion of the low-resolution, rapid-scan signal is separated at the delay means 39 and is applied to a separator processor circuit 42. The separator processor 42 applies the information to the readout side of the storage means 33 and 34 so that the picture readout signal is continuously being modified in accordance with the camera movement operations.

Referring now to the details of the receiver station illustrated in FIG. 5, the incoming information received from the data medium is applied to the receiver 31 and reconverted into a form that can be operated upon by the remainder of the receiver circuit. Conventional receivers that could perform this function are described and illustrated in the previously referenced Modulation Theory, Ch. 5, pp. 59–70 and in the previously referenced M.I.T. Radiation Laboratory Series.

The output from the receiver 31 is applied to a signal separator 32 which separates the high-resolution, slow-scan image signal from the low-resolution, rapid-scan image signal. One way that this could be done is by conventional filtering techniques. One conventional circuit that could perform the signal separation operation is described and illustrated in the above referenced Modulation Theory and in the M.I.T. Radiation Laboratory Series.

The high-resolution, slow-scan image signal from the signal separator 32 is applied to the selector switch 36 which alternately feeds the image signal to one of the two storage means 33 and 34. Thus, if a standard television picture is being processed, the high-resolution, slow-scan picture will have a 525 line x 525 line resolution sequentially repeated at a frame rate of once-per-second. In addition, the selector switch 36 alternately makes and breaks a circuit connection with the output of the storage means 33 and 34 so that the high-resolution image on one storage means is being read out while the subsequent high-resolution image frame is being accumulated on the other storage means. The readout of a selected storage means is done at a television standard of 525 lines x 525 lines, repeated at 30 frames-per-second with two interlaced fields-per-frame. One selector switch that could perform these operations is described and illustrated in the previously referenced Television, Fig. 14.50, p. 599.

The storage means 33 and 34, could be of the same type described with reference to the transmitter station of FIG. 1; that is, that could be either storage tubes or magnetic means.

The high-resolution image signal output from the selector switch 36 is applied to the adder circuit 37 which combines the high-resolution image signal with the low-resolution image signal. One adder circuit that could perform this operation is described and illustrated in the previously referenced Television, Fig. 19.9, p. 880.

As previously stated, the high-resolution image of this system does not provide sufficient animation for the average viewer; thus, the low-resolution differential signal is combined with the high-resolution image signal in the following manner to provide animation. The low-resolution, rapid-scan image signal received from the signal separator 32 is applied to a delay means 39 where it is delayed for the one-second time interval that it takes to accumulate the high-resolution image signal on one of the two storage means 33 and 34. One conventional delay means that could perform this function is a magnetic tape in which a read head is positioned a predetermined distance upstream of a write head, whereupon the time required for the tape to move from the write head to the read head provides the time delay.

The low-resolution differential image signal is applied to a scan converter which converts the image signal to the same form as that contained on the storage means 33 and 34. One conventional converter that could perform this operation is described and illustrated in the previously referenced Electronics World, May 1963, pp. 21–24 and 78, "Recording Storage Tubes and Their Applications," A. S. Luftinan. Thus, the high-resolution signal from the storage means and the low-resolution signal from the converter means 41 are repeated at the same rate of 30 frames per second and are combined or added together at the adder circuit 37.

Since it is necessary to insure that the high-resolution image signal and the low-resolution images are matched or are somewhat congruent with one another, it is necessary to shift the high-resolution image signal in the same manner that the real time low-resolution image signal shifts. To accomplish this shift, the pan, pitch, roll and zoom signal information contained on the horizontal flyback portion of the low-resolution signal is separated at the delay means 39 and applied to the signal processor 42. The signal processor 42 converts the information received from the delay means to a form which will modify the readout of the storage means 33 and 34.

More specifically, where the storage means 33 and 34 are electrical readout storage tubes, the pan signal provides a sidewise deflection of the reading beam to the left or to the right, depending upon whether the camera was panned to the left or to the right. Pitch signals are provided by vertically deflecting the readout beam up or down, depending upon whether the camera was tilted upward or downward. Roll signal information is provided for by rotating the deflection yoke on the readout side of the electrical storage tubes either clockwise or counterclockwise, depending upon the rotation of the camera. Zoom signals are provided for by adjusting the overall deflection amplitude of the read beam to increase or decrease deflection according to whether the camera was zooming in or zooming out on a scene or moving forward or moving backward from the scene. One separator processor circuit 42 that could perform these functions includes a ring counter of 60 counts for horizontal and vertical sync signals from the tape delay. Suitable deflection signals could be obtained in accordance with the circuit techniques disclosed in the previously referenced M.I.T. Radiation Laboratory Series.

To prevent the high-resolution picture from running beyond its edge, it is only necessary to underscan the readout image of the storage tubes 33 and 34 or to overscan the television display 38. As previously explained with reference to the transmitter station, underscanning the storage tubes provides a substantial border of normally unused picture information to which the scene could be shifted during the one-second time interval between the subsequent high-resolution frame. As a result, the combined high-resolution image signal and the low-resolution differential image signal are in substantial synchronism with one another and relatively congruent except for animation information when they are combined at the adder circuit 37.

The combined high-resolution image signal and the low-resolution differential image signal are fed to a conventional television display 38 from the adder 37 as a recombined signal. Television displays that could be used are described and illustrated in the previously referenced Television.

Referring now to the second embodiment of the television system which is illustrated in FIGS. 6 and 7, those circuit components that perform the same operation as the equivalent circuit components in the previously described embodiment will be given the same reference characters throughout this description.

Referring first to the transmitter station illustrated in FIG. 6, the television camera 12 views a scene and converts it to a standard real time television signal. This standard television signal is fed to a frame selector 14 which selects every 30th frame of the real time image and allows it to accumulate on the storage means 16 and a display storage means 46.

The high-resolution, slow-scan channel includes the storage means 16, a modulator 18 and a transmitter 19 which are similar to the corresponding circuit components of the previously described embodiment. The high resolution image in the storage means 16 is read out at a rate of one-frame-per-second to provide an electrical image signal which is fed to the modulator 18 and then to a transmitter 19. Because of the low scan rate the bandwidth requirement for transmitting the high-resolution image signal is moderate.

The transmitter station illustrated in FIG. 6 differs from the transmitter embodiment of FIG. 1 in the structure used to provide the low-resolution, differential signal. Here, the low-resolution, differential signal generation operation is accomplished through electromechanical and optical components in the following manner.

Every 30th frame of the real time image signal generated by the camera 12 is accumulated on the storage display means 46 to provide an optical display output which is a negative image; that is, the image whites are black and the image blacks are white. One storage display that could be used is described and illustrated in Proc. I.R.E. March 1961, vol. 49, No. 2, pp. 567–573, "Selective Erasure and Nonstorage Writing in Direct-View Halftone Storage Tubes," N. H. Lehrer.

In addition, the real time image signal generated by the camera 12 is applied to a television display 47 which reconstructs the image signal as a positive real time image at a standard television rate of 30 frames-per-second. Any conventional monitor or display described and illustrated in the previously referenced Television could perform these operations.

Since most of the picture information contained on the real time display is redundant from the frame-to-frame, it is possible to reduce the bandwidth requirements of the picture information by eliminating the redundant information. This is done by transmitting the positive picture displayed on the television display 47 through a half-silvered mirror 48 to a television camera 49. The negative image from the storage display means 46 is also optically coupled to the television camera 49 by means of a servo-controlled mirror 51 through a servo-controlled zoom lens 52 and is reflected off the half-silvered mirror 48. The redundant information on the stored negative image subtracts from the positive image on the television display 47 so that the television camera 49 only receives the difference information caused by object movement or animation in the real time scene. One television camera 49 that can be used to detect this difference signal is a vidicon camera, described and illustrated in the previously referenced Television, pp. 965–974.

The low-resolution, difference signal from the television camera 49 is repeated at a rate of 30 frames-per-second and is fed to a transmitter 19 where it can be converted to a form which is acceptable to the following data medium.

As in the preceding embodiment, mechanical camera movement such as pan, pitch, roll and zoom operations, can be added to the horizontal flyback signal of the low-resolution differential image signal. To provide this information, sensor means 23 detects the position and movement of camera 12 about its orthogonal axes and converts this information to electrical signals, which can be variable amplitude DC, and applies the signals to signal processor 56. The signal processor 56 converts this sensor information to a form that can be accepted by servo-controlled means 57 for controlling the mechanical servo output to the servo-controlled mirror 51 and the zoom lens 52. Conventional differential servo circuit techniques can be used such as those disclosed in Nixon, F. E., Principles of Automatic Controls, 1956, New York, Prentice-Hall, and in Truxel, Control Systems Synthesis, New York, McGraw-Hill.

For servo operation, the mirror 51 is connected by a servo-controlled means 57 to be tilted along intersecting axes so that the negative image from the storage display means 56 is panned or pitched in accordance with the real time image scene viewed by the television camera 12. For roll information the deflection yoke of the television display 47 is rotated. In addition, the zoom information from camera 12 is converted to a servo signal by processor 56 and servo-controlled means 57 so that the zoom lens 52 can be mechanically moved, thereby varying the magnification of the negative image reflected from the half-silvered mirror 48. As a result, both the negative image stored on the storage display means 46 and the real time image scene viewed by the television camera 12 will be substantially matched to one another or substantially congruent with one another except for movements that occur in the real time scene during the one-second time interval that a frame is stored on the storage display means 46.

The sensor information is also converted to an electrical form which can be applied to the horizontal flyback portion of the low-resolution difference signal at the transmitter circuit 19. Thereafter, this sensor information can be utilized at a compatible receiving station (FIG. 7) to position the high-resolution, slow-scan picture in accordance with the low-resolution difference picture much in the same manner as described in the preceding embodiment.

Referring now to the receiver station illustrated in FIG. 7, the receiver operates in the same manner as the preceding embodiment except for the input stages. The main structural and operational difference is that the picture information is received on two separate channels rather than a single receiver and, thus, two receivers 61 and 62 are required. Since two receivers are used, there is no longer any need to provide a signal separator for separating the high-resolution image signal from the low-resolution signal because the high-resolution image signal is applied directly to the selector switch 36 and the low-resolution, difference image signal is applied directly to the delay means 39.

Thereafter, the remaining stages and operations of the receiver circuit of FIG. 7 are identical to the stages and operations of the receiver circuit of FIG. 5. Thus, no further explanation is thought necessary since reference may be made back to the preceding embodiment wherein identical reference characters have been used throughout for identical components.

While salient features have been illustrated and described with respect to particular embodiments, it should be readily apparent that modifications can be made within the spirit and the scope of the invention, and it is therefore not desired to limit the invention to the exact details shown and described.

What is claimed is:

1. In a television system of the type that operates on real time image signals generated at a frame rate of a plurality of times greater than two times per predetermined time period, a transmitter station comprising: a storage means coupled to receive one real time image signal frame per predetermined time period for storing the image signal frame for the time period; means for generating an image signal of the stored image signal frame over a substantial portion of the time period; circuit means coupled to receive the plurality of real time image signal frames and to receive the stored image signal frame from said storage means for comparing the two received image signal frames and canceling redundant signal information, and generating resultant image signal frames corresponding to changes between the stored image signal frame and the real time image signal frames.

2. In a television system of the type that operates on continually generated real time image signals of scenes at a frame rate of plurality of times greater than two times per predetermined time period, a device comprising: a storage means coupled to receive one real time image signal frame per predetermined time period for storing the image signal frame for the time period; comparator means coupled to receive the plurality of real time image signal frames and coupled to receive the stored image signal frame from said storage means for continually comparing the two received image signal frames and generating difference image signal frames corresponding to changes between the stored image signal and the real time image signals; and means coupled to said storage means and to said comparator means for reading out the stored image signal and for reading out the difference image signal.

3. In a system of the type that operates on real time image signals of scenes generated at a frame rate of a plurality of times greater than two times per predetermined time period, a bandwidth reduction system comprising: a storage means coupled to receive one real time image signal frame per predetermined time period for storing the image frame for the time period; comparator means coupled to receive the plurality of real time image signal frames and to receive the stored image signal frame from said storage means for comparing the two received signal frame and canceling redundant signal information, and generating resultant image signal frames corresponding to changes between the stored image signal frame and the real time image signal frames; and means coupled to said storage means and to said adder means for transmitting the stored image signal frame once over a substantial portion of the time period and for transmitting the resultant image signal frames at the real time frame rate.

4. In a television system of the type that operates on real time image signals generated at a frame rate of a plurality of times greater than two times per predetermined time period, a bandwidth reduction circuit comprising: frame selector means connected to select only one of the plurality of image frames during the time period; a storage means coupled to receive the selected image signal frame selected by said frame selector means for storing the image signal frame for the remainder of the predetermined time period; comparator means coupled to sequentially receive the plurality of real time image signal frames to receive the stored image signal frame from said storage means for continually comparing the two received image signal frames and generating difference image signal frames corresponding to the changes between the stored image signal and the real time image signals; and means coupled to said storage means and to said comparator means for transmitting the stored image signal frame once over a substantial portion of the time period and for transmitting the difference image signal frame at a rate greater than once per time period.

5. In a television system of the type that operates on real time image signals generated at a frame rate of plurality of times greater than two times per predetermined time period, a bandwidth reduction circuit comprising: frame selector means connected to receive the real time image signals for selecting only one frame thereof during the time period; a first and a second storage means coupled to receive the selected frame conducted by said frame selector means and for storing the image frame for the rest of the time period; comparator means coupled to receive the real time image signals and to receive the stored image signal from one of said storage means for continually comparing the two received signals and generating difference image signals corresponding to the changes between the stored image signal and each of the real time image signals; and means coupled to the other said storage means and to said comparator means for transmitting the stored image signal frame once over a substantial portion of the time period and for transmitting the resultant image signal frame at a real time frame rate greater than once per time period.

6. A television system comprising: a camera means for generating real time image signals of scenes at a frame rate of a plurality of times greater than two times per predetermined time period; sensor means coupled to said camera for detecting movement and position of said camera about its axes of movement and generating signals corresponding to the detected camera movement; a storage means coupled to receive one real time image signal frame per predetermined time period and for storing the image frame for the time period; circuit means coupled to receive the real time image signals from said camera and coupled to receive the stored image signals from said storage means for comparing the two received image signals and canceling redundant signal information and generating resultant image signals corresponding to changes between the stored image signal and the real time image signals; and means coupled to said storage means, to said circuit means and to said sensor means for receiving and transmitting the stored image signal, for receiving and transmitting the resultant image signal, and for receiving and transmitting the camera movement signals.

7. A television system comprising: a camera means for generating real time image signals of scenes at a frame rate of a plurality of times greater than two times per predetermined time period; sensor means coupled to said camera for detecting movement and position of said camera about its axes of movement and generating signals corresponding to the detected camera movement; a storage means coupled to receive one real time image signal frame per predetermined time period for storing the image frame for the time period, said sensor means being coupled to said storage means for changing the stored image signal to correspond to camera movement information; circuit means coupled to receive the real time image signals from said camera and coupled to receive the stored image signals from said storage means for comparing the two received image signals and canceling redundant signal information for generating resultant image signals corresponding to changes between the stored image signal and the real time image signal; and means coupled to said storage means, to said circuit means and to said sensor means for receiving and transmitting the stored image signal for receiving and transmitting the resultant image signals, and for receiving and transmitting the camera movement signals.

8. A television system comprising: a camera means for generating real time image signals of scenes at a frame rate of a plurality of times greater than two times per predetermined time period, said camera means including a zoom lens means; sensor means coupled to said camera means and to said zoom lens means for detecting movement and position of said camera about its axes of movement and generating signals corresponding to the detected camera movement and for detecting focus of said zoom lens and generating a focus signal; a storage means coupled to receive one real time image signal frame per predetermined time period and for storing the image signal frame for the time period; circuit means coupled to receive the real time image signals from said camera and coupled to receive the stored image signal from said storage means for comparing the two received image signals and canceling redundant signal information and for generating resultant image signals corresponding to changes between the stored image signals and the real time image signal, said circuit means being further connected to receive the focus signal for varying the magnification of the stored image signal to correspond to the change in zoom magnification of the real time signal; and means coupled to said storage means, to said circuit means and to said sensor means for receiving and transmitting the stored image signal, for receiving and transmitting the resultant image signals, and for receiving and transmitting the camera movement signals.

9. In a television system of the type in which the image signal is divided into a high-resolution image signal repeated at a frame rate of once per time period and into a real time difference image signal corresponding to changes between the high-resolution image signal repeated once per time period, and a real time image signal repeated at a frame rate of a plurality of times greater than two times per time period, a circuit comprising: selector means including a first storage means and a second storage means each connected to receive alternate frames of the high-resolution image signal for storing one received high-resolution image during the subsequent time period that the other storage means is receiving a subsequent high-resolution image signal; means connected to said storage means for repeatedly reading out at a frame rate greater than once per time period the one of said storage means that has an image signal stored therein and is not receiving a high-resolution image signal and developing a repeated high-resolution image signal; and an adder circuit connected to receive the repeated high-resolution readout image signal from said storage means and connected to receive the real time difference image signal for combining the two received image signals whereby a resultant image signal is developed corresponding to the combined information contained on the two received signals.

10. In a television system of the type in which the image signal is divided into a high-resolution image signal repeated at a frame rate of once per time period and into a real time difference image signal corresponding to changes between the high-resolution image signal repeated once per time period, and a real time image signal repeated at a frame rate of a plurality of times greater than two times per time period, a circuit comprising: selector means including a first storage means and a second storage means connected to receive alternately the high-resolution image signal for storing one received high-resolution image signal during the subsequent time period that the other storage means is receiving a subsequent high-resolution image signal; means connected to said storage means for repeatedly reading out at a frame rate greater than once per time period, the one of said storage means that has an image signal stored therein and is not receiving a high-resolution image signal and developing a repeated high-resolution image signal; means connected to receive one of the image signals for synchronizing the repeated high-resolution readout signal with the real time difference signal; and an adder circuit connected to receive the repeated high-resolution readout image signal from said storage means and connected to receive the real time difference image signal for combining the two received image signals whereby a resultant image signal is developed corresponding to the combined information contained on the two received signals.

11. In a television system of the type in which the image signal is divided into a high-resolution image signal repeated at a frame rate of once per time period and into a real time difference image signal corresponding to changes between the high-resolution image signal repeated once per time period, and a real time image signal repeated at a frame rate of a plurality of times greater than two times per time period, a circuit comprising: selector means including a first storage means and a second storage means connected to receive alternately the high-resolution image signal and storing the received high-resolution image signal during the subsequent time period that the other storage means is receiving the subsequent high-resolution image signal; means connected to said storage means for repeatedly reading out the one of said storage means that has stored and is not receiving a high-resolution image signal at a frame rate greater than once per time period and developing a repeated high-resolution image signal; delay means connected to receive the real time difference image signal for delaying the received signals into synchronism with the repeatedly readout high-resolution signal; and an adder circuit connected to receive the repeated high-resolution readout image signal from said storage means and connected to receive the real time difference image signal for combining the two received image signals whereby a resultant image signal is developed corresponding to the combined information contained on the two received signals.

12. In a television system of the type in which the image signal is divided into a high-resolution image signal repeated at a frame rate of once per time period and into a real time difference image signal corresponding to changes between the high-resolution image signal repeated once per time period, a real time image signal repeated at a frame rate of a plurality of times greater than two times per time period, and a signal corresponding to shift in the position of the real time image relative to high-resolution image signals during the period, a circuit comprising: storage means coupled to receive the high-resolution image signal and storing the received signal for the time period; means connected to receive the signal corresponding to the shift in position of the real time image signal and the high-resolution image signal for shifting and repositioning the stored image into substantial synchronism with the real time difference image signal; means connected to said storage means for repeatedly reading out said storage means at a frame rate greater than once per time period and developing a repeated high-resolution image signal; and an adder circuit connected to receive the repeated high-resolution readout image signal from said storage means and connected to receive the real time difference image signal for combining the two received image signals whereby a resultant image signal is developed corresponding to the combined information contained on the two received signals.

13. In combination with a television system of the type that utilizes a television camera which produces a high-resolution real time image signal generated at a frame rate of a plurality of times greater than two times per time period: a storage means coupled to receive one real time image frame per predetermined time period for storing the image frame signal for the time period; means connected to receive the stored image signal for shifting the stored image signal in response to movement of the television camera into substantial spatial synchronism with the corresponding portion of the real time image signal; comparing means coupled to receive the real time image signals and coupled to receive the stored image signals from said storage means for continually comparing the two received signals and canceling redundant signal information, and generating a difference image signal corresponding to changes between the stored image signal and the real time image signal; means coupled to said storage means and to said comparing means for receiving and transmitting the stored image signal and for receiving and transmitting the difference image signal to a data medium; means coupled to receive the stored image signal and the difference image signals from the data medium for shifting the stored image signal and combining the stored image signal minus the border portion thereof and the received difference image signals in substantial spatial synchronism with one another; and display means coupled to receive the combined signals for displaying the image.

14. In combination with a television system of the type that utilizes a high-resolution real time image signal generated at a frame rate of a plurality of times greater than two times per time period; a storage means coupled to receive one real time image frame per predetermined time period for storing the image frame signal for the time period; bias means connected to receive the stored image signal for shifting the stored image signal into substantial synchronism with the corresponding portion of the real time image signal; comparing means coupled to receive the real time image signals and coupled to receive the stored image signals from said storage means for continually comparing the two received signals and canceling redundant signal information, and generating a difference image signal corresponding to changes between the stored image signal and the real time image signal; means coupled to said storage means and to said comparing means for receiving and transmitting the stored image signal and for receiving and transmitting the difference image signal to a data medium; means coupled to receive the stored image signal and the difference image signal from the data medium; bias means coupled to receive one of the received signals for shifting the image signals into substantial synchronism with one another; means coupled to receive the substantially synchronized image signal for combining the signals into a composite image signal whereby the image signal can be processed into an image display; and display means coupled to receive the combined signals for displaying the image.

References Cited

UNITED STATES PATENTS

| | | | |
|---|---|---|---|
| 2,202,605 | 5/1940 | Schroter | 178—6 |
| 2,321,611 | 6/1943 | Moynihan | 178—6.8 |

| | | | |
|---|---|---|---|
| 2,629,010 | 2/1953 | Graham | 178—6 |
| 2,951,899 | 9/1960 | Day | 178—6.8 |

OTHER REFERENCES

Barnette & Olive: Bandwidth Reduction for Television, Aug. 1958, R.C.A. technical note: 152–178–6 BWR.

ROBERT L. GRIFFIN, *Primary Examiner.*

J. A. ORSINO, *Assistant Examiner.*

U.S. Cl. X.R.

178—6; 325—38.1; 179—15.55